US007697526B2

(12) United States Patent
Ambe et al.

(10) Patent No.: US 7,697,526 B2
(45) Date of Patent: Apr. 13, 2010

(54) PACKET FILTERING BASED ON PORT BIT MAP

(75) Inventors: Shekhar Ambe, San Jose, CA (US); Sandeep Kumar Relan, Bangalore (IN)

(73) Assignee: Broadcom Corporation, Irvine, CA (US)

( * ) Notice: Subject to any disclaimer, the term of this patent is extended or adjusted under 35 U.S.C. 154(b) by 1438 days.

(21) Appl. No.: 10/212,211

(22) Filed: Aug. 6, 2002

(65) Prior Publication Data

US 2004/0032869 A1 Feb. 19, 2004

(51) Int. Cl.
*H04L 12/28* (2006.01)

(52) U.S. Cl. ........................ 370/392; 370/422

(58) Field of Classification Search ................ 370/392, 370/422

See application file for complete search history.

(56) References Cited

U.S. PATENT DOCUMENTS 5,473,607 A 12/1995 Hausman et al.
5,568,477 A 10/1996 Galand et al.
5,761,424 A 6/1998 Adams et al.
5,781,549 A 7/1998 Dai
5,787,084 A 7/1998 Hoang et al.
5,987,507 A 11/1999 Creedon et al.
6,335,935 B2 1/2002 Kadambi et al.
6,341,130 B1 1/2002 Lakshman et al.
7,099,317 B2 8/2006 Ambe et al.
7,136,381 B2 11/2006 Battle et al.
2001/0012294 A1* 8/2001 Kadambi et al. ............ 370/392
2002/0009083 A1* 1/2002 Ambe et al. ................ 370/390
2002/0012341 A1* 1/2002 Battle et al. ................ 370/378
2002/0069294 A1 6/2002 Herkersdorf et al.
2003/0174703 A1* 9/2003 Relan ........................ 370/392

FOREIGN PATENT DOCUMENTS

WO WO 02/15497 2/2002

* cited by examiner

*Primary Examiner*—Kevin C Harper

(57) ABSTRACT

A network device for processing a packet can have at least one port within the network device configured to received or transmit a packet, and a storage unit configured to store a port bit map, wherein the port bit map corresponds to the at least one port. Furthermore, the network device for processing a packet can have a rules table configured to have at least one port match entry and at least one action corresponding to the at least one port match entry therein, and a control unit configured to compare the port bit map with the at least one port match entry, and to implement the at least one action when a first positive value results from comparing the port bit map with the port match entry.

46 Claims, 5 Drawing Sheets

PACKET FILTERING BASED ON PORT BIT MAP

BACKGROUND OF THE INVENTION

1. Field of the Invention

The present invention relates to a method and an apparatus for filtering a packet based on a port bit map within a communication network environment such as token ring, ATM, Ethernet, Fast Ethernet, Gigabit Ethernet and 10 Gigabit Ethernet, or any other networking environment. Moreover, the present invention can be applied to any packet-based media environment. In particular, the present invention relates to a packet filter and a method for filtering a packet that can be implemented on a semiconductor substrate such as a silicon chip.

2. Description of the Related Art

In networking applications, an incoming packet enters an ingress port of a network component, such as a switch, wherein the network component processes the incoming packet and directs it to an egress port. In processing the incoming packet, the network component can examine the incoming packet on the ingress side of the network component, and can determine addressing and routing information to enhance network performance.

The network component can apply various addressing and processing logic to the incoming packet when examining the incoming packet. As the demands for higher speed and lower cost network components increases, so does the demand for an innovative system to meet such demands. Accordingly, a fast, efficient and low cost network component can greatly benefit the communication network environment.

SUMMARY OF THE INVENTION

One example of the present invention can include a method of processing a packet in a communication network. The method can include the steps of receiving the packet in a network component, and generating a port bit map based on the packet received within the network component. Furthermore, the method can include the steps of identifying a port match entry, comparing the port bit map with the port match entry, and implementing at least one action when there is a match between the port bit map and the port match entry.

In another example, the present invention can relate to a network device for processing a packet. The network device can have at least one port within the network device configured to receive or transmit a packet, and a storage unit configured to store a port bit map, wherein the port bit map corresponds to the at least one port. The network device can also have a rules table configured to have at least one port match entry and at least one action corresponding to the at least one port match entry therein. A control unit is configured to compare the port bit map with the at least one port match entry, and to implement the at least one action when there is a match between the port bit map and the port match entry.

Furthermore, another example of the present invention can provide a system for processing a packet in a communication network. The system can have a receiving means for receiving the packet in a network component, a generating means for generating a port bit map based on the packet received within the network component, and an identifying means for identifying a port match entry. Additionally, the system can have a comparing means for comparing the port bit map with the port match entry, and an implementing means for implementing at least one action when there is a match between the port bit map and the port match entry.

BRIEF DESCRIPTION OF THE DRAWINGS

For proper understanding of the invention, reference should be made to the accompanying drawings, wherein.

DETAILED DESCRIPTION OF THE PREFERRED EMBODIMENT(S)

Figure 1:
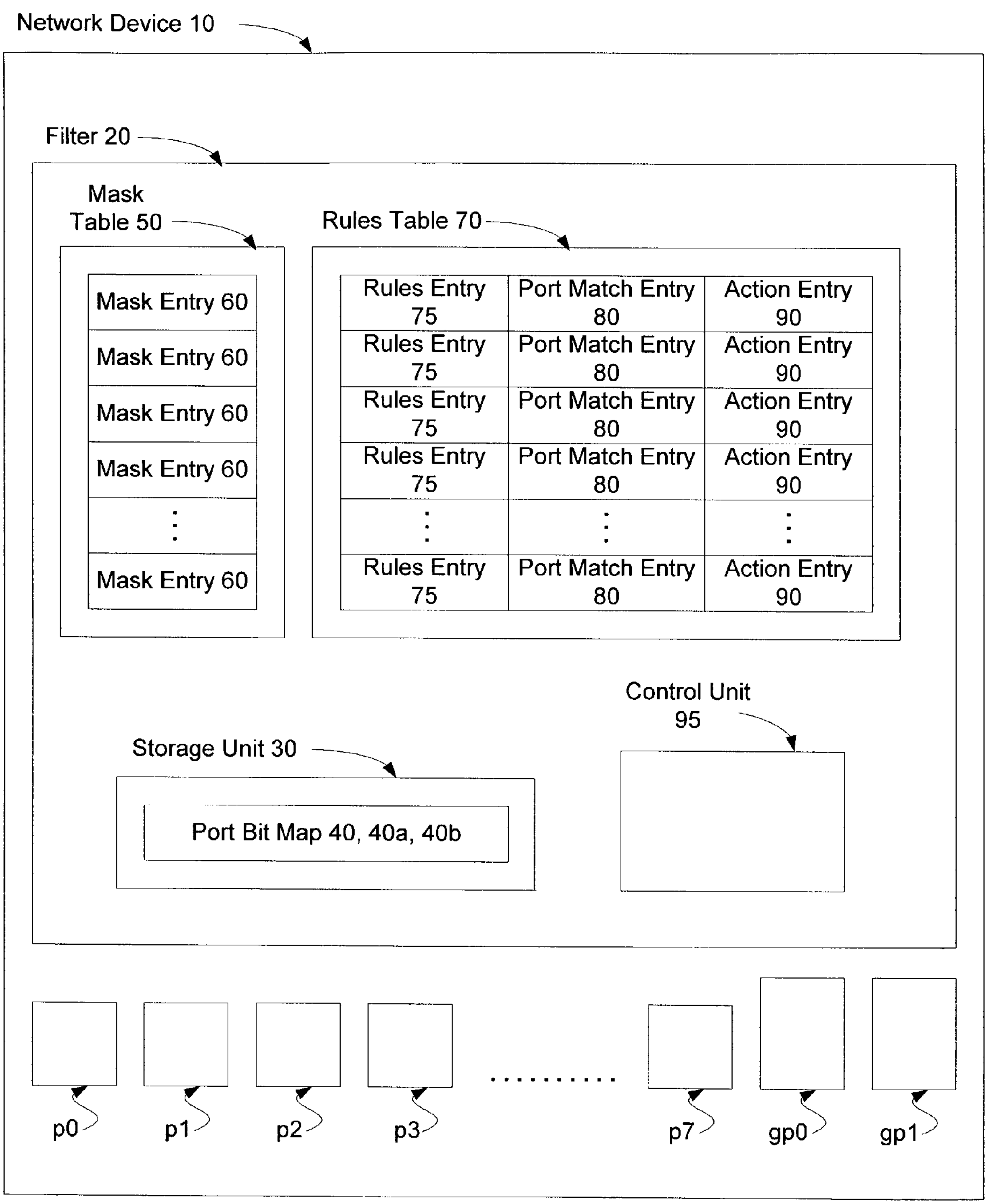
FIG. 1 illustrates one example of a configuration for filtering a packet in accordance to the present invention.

FIG. 1 illustrates one example of a hardware configuration that can perform packet filtering based on a port bit map, in accordance with the present invention. The performance of packet filtering can also be referred to as packet classification. Therefore, the hardware configurations and examples provided herein can also perform packet classification.

Additionally, the hardware configuration of FIG. 1 can be in an integrated, modular and single chip solution, and therefore can be embodied on a semiconductor substrate, such as silicon. Alternatively, the hardware configuration of FIG. 1 can be embodied in a plurality of discrete components on a circuit board.

The configuration as shown in FIG. 1 illustrates an example of a network device 10, such as a switching chip. The network device 10 can have a plurality of ports, such as port p0, port p1, port p2, port p3, port p4, port p5, port p6, port p7, and gports gp0 and gp1. In this example, the network device can have 8 fast Ethernet ports, ports p0, p1, p2, p3, p4, p5, p6, p7 and 2 Gigabit ports, gports gp0 and gp1 with one expansion port that can chain other chips together (expansion port not shown).

Each port, p0, p1, p2, p3, p4, p5, p6, p7, and gp0 and gp1, can be a receiving port, or an ingress port as well a transmitting port, or an egress port, for receiving and transmitting a packet, respectively. Although the network device 10 of the present example can receive and transmit a packet, in other examples of the present invention, the network device 10 can also receive and transmit data in other formats, such as a data frame, or a data cell. Therefore, any reference to a packet herein can also refer to at least a frame, a cell, or a data packet, a data frame or a data cell.

The network device 10 can also include a filter 20, wherein the filter 20 can perform packet filtering. The filter 20 can have a storage unit 30, a mask table 50 and a rules table 70 therein. The storage unit 30 can be any storage or memory device, such as a register. In this example, the storage unit 30 can be embedded within the filter 20. However, it is noted that the storage unit 30 can be embedded outside the filter 20. The storage unit 30 can hold or store a port bit map 40 generated by the internal logic of the network device 10.

The port bit map 40 can either be an ingress port bit map 40*a* or an egress port bit map 40*b*, or both. The ingress port bit map 40*a* can be a port bit map 40 having a bit length equal to a number of ingress port(s). The number of ingress port(s) can be one or more ingress port(s) within the network device 10. Each bit position of the ingress port bit map 40*a* can be one bit in length and can correspond to a particular ingress port within the network device 10 with respect to a packet received. Additionally, each bit position of the ingress port bit map 40*a* can be set as a conditional flag with respect to a packet received within the network device 10. In one example, each bit position can be set with a conditional flag of either 1 or 0.

Suppose for example a network device 10 can have a port configuration of eight ingress ports, p0, p1, p2, p3, p4, p5, p6, and p7; and a packet is received in port p3 of the network device 10. Given this example, an ingress port bit map 40*a* can have a bit length of eight bits, wherein bit position one of the ingress port bit map 40*a* can correspond to ingress port p0, bit position two of the ingress port bit map 40*a* can correspond to ingress port p1, and so forth for bit positions three, four, five, six, seven, eight and ports p2, p3, p4, p5, p6, p7, respectively. Accordingly, bit position four of the ingress port bit map 40*a*, which corresponds to ingress port p3, can be set with conditional flag "1" because a packet was received in port p3 of the network device 10. In the alternative, bit positions one, two, three, five, six, seven, and eight corresponding to ingress ports p0, p1, p2, p4, p5, p6, and p7, respectively can be set with conditional flag "0" or can be set as default condition "0" because the packet was not received in any one of ports p0, p1, p2, p4, p5, p6, and p7. Therefore, the internal logic of the network device 10 can generate an ingress port bit map 40*a* having a bit string of "00010000", for this example. Additionally, a storage unit 30 within filter 20 can store the ingress port bit map 40*a* having the above bit string therein.

As mentioned above, the port bit map 40 can either be an ingress port bit map 40*a* or an egress port bit map 40*b*, or both. In the alternative, the egress port bit map 40*b* can be a port bit map 40 having a bit length that is less than, equal to, or greater than a number of egress port(s). The egress port bit map 40*b* can have a bit length that is less than a total number of egress port(s) because the egress port bit map 40*b* can be dependent on only the egress port(s) that are under consideration in the filter 20. The number of egress port(s) can be one or more egress port(s) within the network device 10. Each bit position of the egress port bit map 40*b* can be one bit in length and can correspond to a particular egress port within the network device 10. Additionally, each bit position of the egress port bit map 40*b* can be set as a conditional flag with respect to transmitting the packet out the network device 10. In one example, each bit position can be set with a conditional flag of either 1 or 0.

For instance, suppose for example a network device 10 can have a port configuration of twenty-seven egress ports, which can include a CPU egress port and a stack link egress port. As such, the port configuration of the network device 10 can include twenty-four FE egress ports, FE1 . . . FE24, two GE egress ports, GE1, GE2, and one CPU egress port, CPU1 (24FE+2GE+1CPU=27 egress ports). Further suppose that a packet is received in port p3 of the network device 10, and the packet received is processed by Filter 20 and is then destined to be transmitted out of egress ports FE1, FE3, FE5 and CPU1. Given these circumstance of this example, an egress port bit map 40*b* can have a bit length of twenty-seven bits, wherein bit position one of the egress port bit map 40*b* can correspond to egress port FE1, bit position two of the egress port bit map 40*b* can correspond to egress port FE2, and so forth for bit positions three, four, five, six . . . twenty-seven, and for egress ports FE3, FE4 . . . FE24, GE1, GE2, and CPU1, respectively. Accordingly, bit positions one, three, five and twenty-seven of the egress port bit map 40*b*, which corresponds to egress ports FE1, FE3, FE5 and CPU1, can each be set with conditional flag "1" because the filter 20 can process the packet and determine that the packet received is to be transmitted out of egress ports FE1, FE3, FE5 and CPU1 of the network device 10. In the alternative, bit positions two, four, six, seven, eight, nine, ten . . . twenty-six, corresponding to egress ports FE2, FE4, FE6, FE7, FE8, FE9, FE10 . . . and GE2, respectively can be set with conditional flag "0" or can be set as default condition "0" because the packet received is not to be transmitted out of any one of ports FE2, FE4, FE6, FE7, FE8, FE9, FE10 . . . and GE2. Therefore, internal logic of the network device 10 can generate an egress port bit map 40*b* having a bit string of "101010000000000000000000001", for this example. Additionally, a storage unit 30 within filter 20 can store the egress port bit map 40*b* having the above bit string therein.

It is noted that an ingress port bit map 40*a* can be generated from a particular ingress port in which a packet was received. In the alternative, it is noted that an egress port bit map 40*b* can be generated from the address resolution logic (ARL) of an incoming packet. Furthermore, it is noted that a port bit map 40 can be a vector and can be of any binary encoding scheme, such as BCD or Grey encoding scheme and can be in any layout format, such as big-endian or little endian format.

Also shown in FIG. 1 is a mask table 50 within filter 20. The mask table 50 can have a plurality of mask entries 60 therein. Each mask entry 60 can represent a filter mask for masking an incoming packet based on one or more programmable condition(s). Therefore, each mask entry 60 can be pre-programmed with one or a plurality of filtering condition(s), including but not limited to an exact match or partial-bit match condition(s). Accordingly, the mask table 50 can mask an incoming packet through one or more mask entry therein.

Furthermore, FIG. 1 illustrates a rules table 70 that can be configured to include one or more rules entry 75, one or more port match entry 80, and one or more action entry 90. Each rules entry can correspond to one port match entry 80 and one action entry 90. Moreover, each rules entry 75 can be pre-programmed within the rules table 70, and each rules entry 75 can be a bit string having a bit length of "m", wherein "m" can be any value. For example, the rules entry 75 can be a predetermined programmable rules value configured to be a bit string of 1's and/or 0's. The rules entry 75 can also be pre-programmed to have one or more condition(s) or rule(s) to be compared with a masked packet in order to determine if there is a match or no-match between the masked packet and at least one rules entry 75.

FIG. 1 also illustrates a rules table 70 configured to have one or more port match entry 80 therein. Each port match entry 80 can be an ingress port match entry or an egress port match entry, or both an ingress and egress port match entry. Similar to each rules entry 75 as discussed above, each one of the port match entry 80 can correspond to one rules entry 75 and one action entry 90. Each port match entry 80 can be pre-programmed within the rules table 70, and each port match entry 80 can be a bit string having a bit length that can equal to a number of ingress port(s), a number of egress port(s), a number of egress port(s) under consideration, or a number of both ingress and egress ports, within the network device 10. Each bit position of the port match entry 80 can correspond to a particular ingress port or a particular egress port within the network device 10. Furthermore, each bit position of the port match entry 80 can be set with a value or a condition of "1" or "0". Setting the bit position with a value or condition of "1" can specify or indicate that the corresponding port can be associated with or related to the corresponding rules entry 75 and action entry 90. In the alternative, setting the bit position with a value or condition or "0" can specify or indicate that the corresponding port is not associated with or related to the corresponding rules entry 75 and action entry 90.

In other words, each port match entry 80 can be a predetermined programmable bit string wherein each bit position of the port match entry 80 can be set with a "1" or "0" to correspond to a particular port within a network device 10. Suppose for example, a network device can have a port configuration of eight ingress ports p0, p1, p2, p3, p4, p5, p6, p7. Accordingly, the port match entry 80 can be a bit string having a bit length of eight bits, wherein each bit position of the port match entry 80 can correspond to one ingress port. Thus, bit position one of the port match entry 80 can correspond to port p0, bit position two can correspond to port p1, bit position three can correspond to port p2, and so forth with respect to bit positions four, five, six, seven, eight, and ports p3, p4, p5, p6, p7, respectively. Further suppose for example that any incoming packet received within ingress ports p2, p4 and p6 shares a same rule entry 75 and therefore share a corresponding action entry 90. As such, a corresponding port match entry 80 within a rules table 70 can be a bit string of "001010100", wherein bit positions three, five, and seven can be set with a value "1" to specify or indicate the relationship or association with respect to any incoming packet received within ports p2, p4, p6.

Further shown in FIG. 1, rules table 70 can include one or more action entry 90 therein. Each action entry 90 can correspond to one rules entry 75 and one port match entry 80. Each action entry 90 can be pre-programmed within the rules table 70, and each action entry 90 can contain any information or data, such as at least one instruction, at least one op-code, at least one value, at least one default action, at least one task, and etc. Furthermore, each action entry 90 can be configured in any information format. Some examples of exact match actions within the action entries 90 can be: changing a priority of a packet, copying to CPU, dropping a packet, changing a DSCP, changing a VLAN ID, and etc. Furthermore, some examples of no-match actions can be redirecting a packet, sending to CPU, dropping a packet, and etc. It is noted that one or more of the above example action(s) can be set in each of the action entry 90.

FIG. 1 also shows a control unit 95 within filter 20. The control unit 95 can be configured to perform a plurality of functions including but not limited to performing a function of comparing the port bit map 40 with a respective port match entry 80 to determine if there is a match or no-match. The function of comparing the port bit map 40 with a respective port match entry 80 can be implemented by any means or technique. One such implementation technique can include the logical AND'ing of the port bit map 40 with a respective port match entry 80. It is noted that although the control unit 95 is provided within filter 20, the control unit 95 can be provided outside the filter 20.

Figure 2:
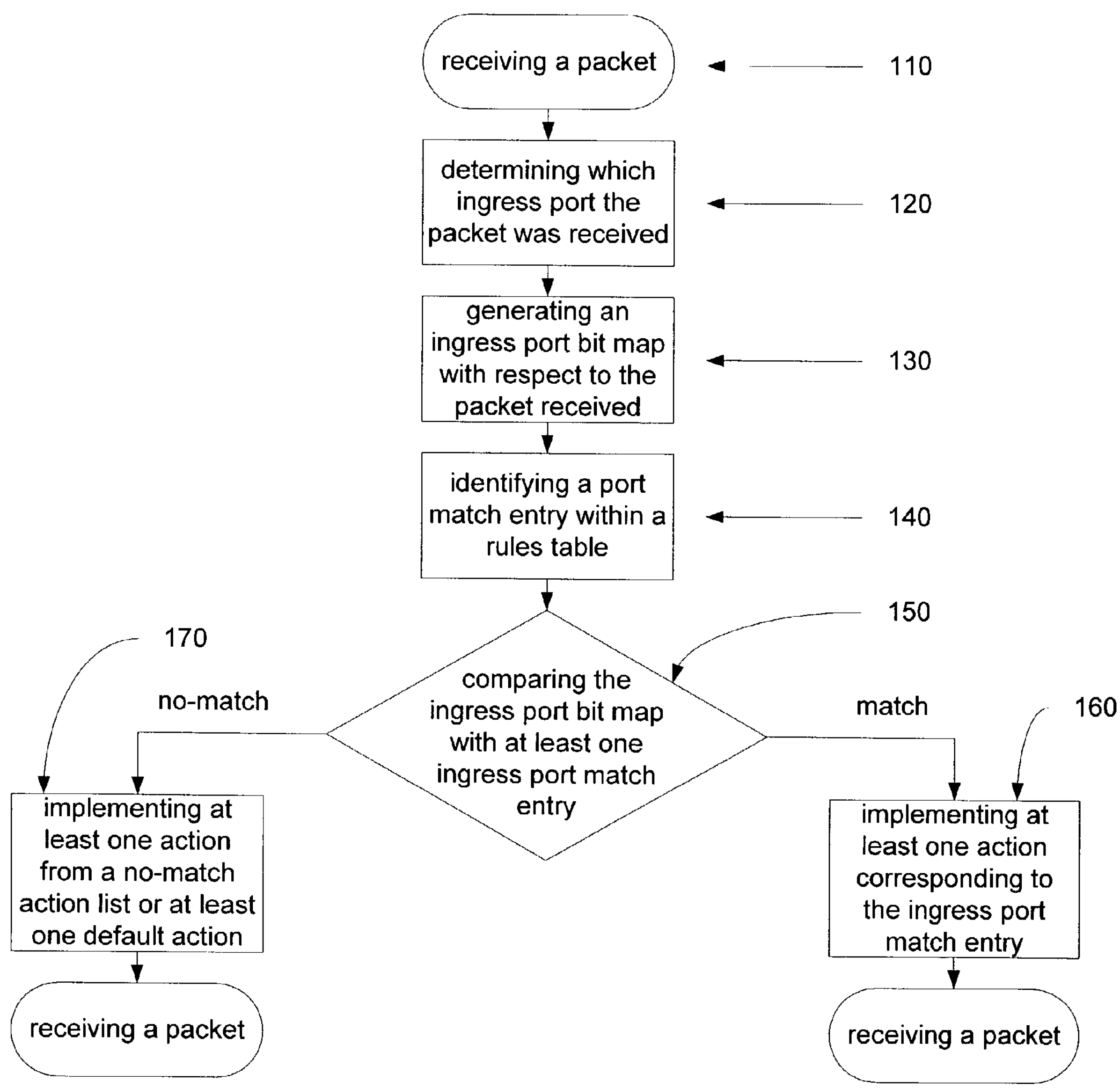
FIG. 2 illustrates a flow chart illustrating one example of a method of filtering a packet in accordance to the present invention.

FIG. 2 illustrates one example of a method of filtering incoming packets with respect to ingress port(s) in accordance with the present invention. The method of the present example can be implemented in hardware, or software, or a combination of both hardware and software.

An incoming packet can be received in an ingress port within a network device 10. Accordingly, a network device at step 110 of FIG. 2 can receive a packet in an ingress port. Upon receiving the packet, the internal logic of the network device 10 at step 120 can determine which ingress port within the network device 10 received the incoming packet. Thereafter, step 130 can generate an ingress port bit map that can correspond to the ingress port the packet was received in. The ingress port bit map can be stored in a storage unit 30 within a filter 20.

For example, a network device 10 can have a port configuration of eight ingress ports, p0, p1, p2, p3, p4, p5, p6, and p7. Suppose for this example that port p7 of the network device 10 receives a packet at step 110. The internal logic determines at step 120 that ingress port p7 received the incoming packet. Based on this information, an ingress port bit map 40*a* can be generated at step 130, wherein the ingress port bit map 40*a* can have a bit length of 8 bits and wherein bit position number eight corresponds to ingress port p7. Accordingly, for this example, the internal logic of the network device 10 can generate an ingress port bit map 40*a* having a bit string of "00000001", wherein the left most bit position corresponds to port 0 and the right most bit position corresponds to port 7 of the network device 10. The generated ingress port bit map 40*a* can be stored in storage unit 30 within filter 20.

Further shown in FIG. 2, step 140 can identify or determine an ingress port match entry 80 among a plurality of ingress port match entries within the rules table 70. Upon identifying the port match entry 80, the ingress port bit map 40*a* generated in step 130 can be compared with the ingress port match entry 80 at step 150. When performing the comparison between the ingress port bit map 40*a* and the ingress port match entry 80, the internal logic of the network device 10 can implement a variety of comparison techniques, such as a logical AND operation, wherein the ingress port bit map 40*a* can be logically AND with the identified ingress port match entry 80 in the Control Unit 95.

If the comparison between the ingress port bit map 40*a* and the identified ingress port match entry 80 results in a match, or results in a value greater than zero (>0), then at least one action corresponding to the matching ingress port mach entry 80 can be implemented on the packet received at step 160. For instance, if the identified ingress port match entry 80 matches with the ingress port bit map 40*a* upon comparing the two by way of logically AND'ing the two, then an action entry 90 corresponding to the matching ingress port match entry 80 can be implemented on the packet received.

In the alternative at step 170 of FIG. 2, if the comparison between the ingress port bit map 40*a* and the identified ingress port match entry 80 results in a no-match or results in a value that equals to zero (=0), then at least one action from a no-match action list or at least one default action can be implemented on the packet received. For instance, if the identified ingress port match entry 80 does not match the ingress port bit map 40*a* upon comparing the two by way of logically AND'ing the two together, then at least one action from a no-match action list or at least one default action can be implemented on the packet received.

Accordingly, one example of the method steps of FIG. 2 can be expressed in the following conditional expression:

```
IF ((ingress port bit map 40a AND ingress port match entry 80) > 0);
THEN
        match, i.e., implement action entry;
ELSE
        no-match, i.e., implement no-match action(s) or default
        action(s).
```

Figure 3:
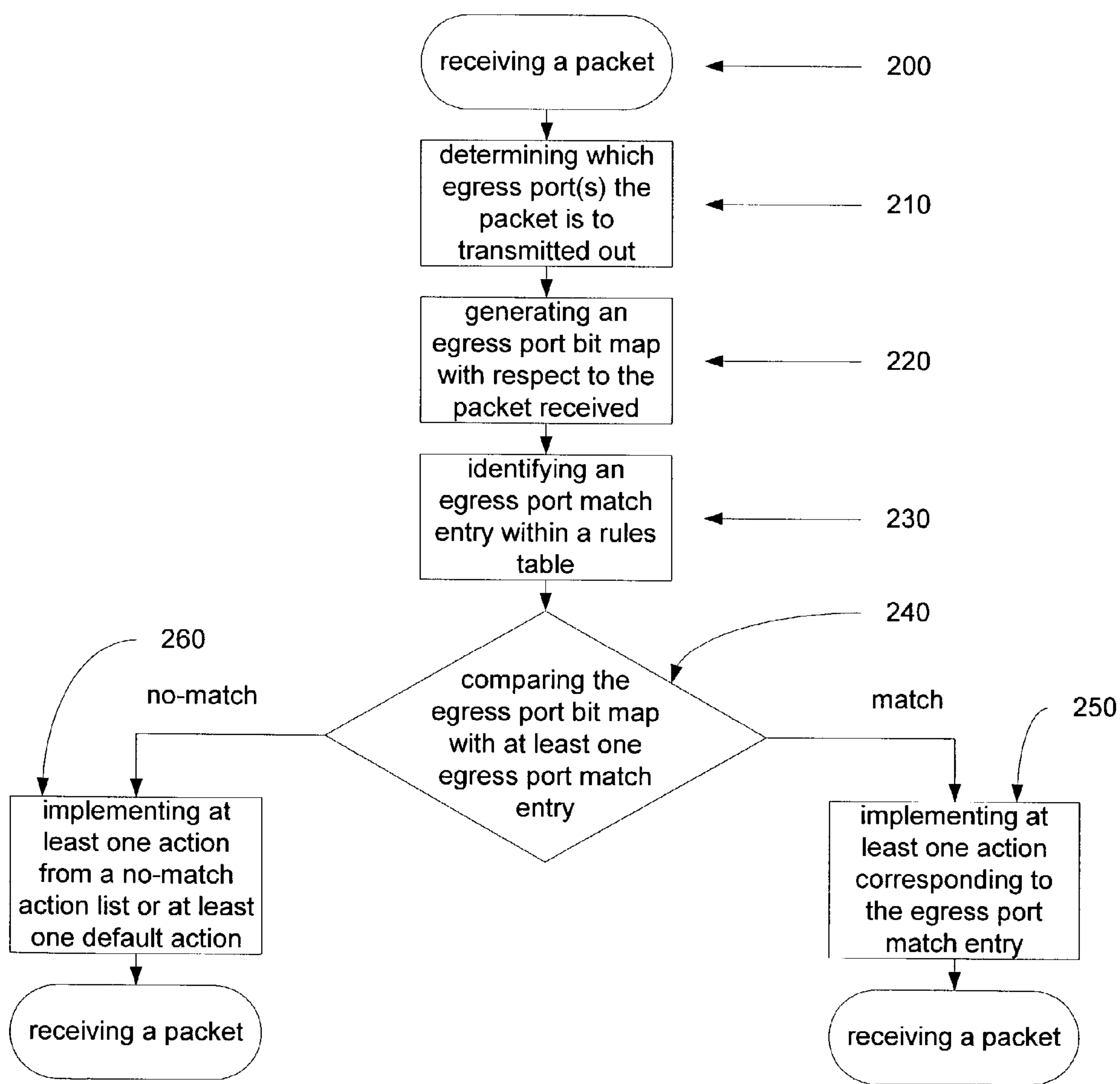
FIG. 3 illustrates a flow chart illustrating another example of a method of filtering a packet in accordance to the present invention.

FIG. 3 illustrates another example of a method of filtering incoming packets with respect to egress port(s) in accordance with the present invention. The method of the present example can be implemented in hardware, or software, or a combination of both hardware and software.

As mentioned above, an incoming packet can be received in an ingress port within a network device 10. Accordingly, a network device at step 200 of FIG. 3 can receive a packet in an ingress port. Upon receiving the packet, the address resolution logic of the network device 10 at step 210 can determine which one or more egress port(s) within the network device 10 which the packet received is to be transmitted out of the network device 10. Thereafter, step 220 can generate an egress port bit map 40*b* that can correspond to the egress port(s) in which the packet received is to be transmitted out of the network device 10. The egress port bit map 40*b* can be stored in a storage unit 30 within a filter 20.

For example, a network device 10 can have a port configuration of twenty-seven egress ports, which can include a CPU egress port and a stack link egress port. As such, the port configuration of the network device 10 can include twenty-four FE egress ports, FE1 . . . FE24, two GE egress ports, GE1, GE2, and one CPU egress port, CPU1 (24FE+2GE+1CPU=27 egress ports). Suppose for this example that port p7 of the network device 10 receives a packet at step 200, and the address resolution logic determines at step 210 that the packet received is to be transmitted out of egress port(s) FE1, FE2, FE3 and FE4. Based on this information, an egress port bit map 40*b* can be generated at step 220, wherein the egress port bit map 40*b* can have a bit length of 27 bits and wherein bit positions one, two, three, and four correspond to egress ports FE1, FE2, FE3 and FE4, respectively. Accordingly, for this example, the internal logic of the network device 10 can generate an egress port bit map 40*b* having a bit string of "111100000000000000000000000", wherein the left most bit position corresponds to port 0 or port FE1 and the right most bit position correspond to port 27 or port CPU. The generated egress port bit map 40*b* can be stored in storage unit 30 within filter 20.

Further shown in FIG. 3, step 230 can identify or determine an egress port match entry 80 among a plurality of egress port match entries within the rules table 70. Upon identifying the egress port match entry 80, the egress port bit map 40*b* generated in step 220 can be compared with the egress port match entry 80 at step 240. When performing the comparison between the egress port bit map 40*b* and the egress port match entry 80, the internal logic of the network device 10 can implement a variety of comparison techniques, such as a logical AND operation, wherein the egress port bit map 40*b* can be logically AND with the identified egress port match entry 80 in the Control Unit 95.

If the comparison between the egress port bit map 40*b* and the identified egress port match entry 80 results in a match, or results in a value greater than zero (>0), then at least one action corresponding to the matching egress port mach entry 80 can be implemented on the packet received at step 250. For instance, if an identified egress port match entry 80 matches the egress port bit map 40*b* upon comparing the two by way of logically AND'ing the two, then an action entry 90 corresponding to the matching egress port match entry 80 can be implemented on the packet received.

In the alternative at step 260 of FIG. 3, if the comparison between the egress port bit map 40*b* and an identified egress port match entry 80 results in a no-match, or results in a value that equals to zero (=0), then at least one action from a no-match action list or at least one default action can be implemented on the packet received. For instance, if the identified egress port match entry 80 does not match the egress port bit map 40*b* upon comparing the two, by way of AND'ing the two together, then at least one action from a no-match action list or at least one default action can be implemented on the packet received.

Accordingly, one example of the method steps of FIG. 3 can be expressed in the following conditional expression:

```
IF ((egress port bit map 40b AND egress port match entry 80) > 0); THEN
        match, i.e., implement action entry;
ELSE
        no-match, i.e., implement no-match action(s) or default
        action(s).
```

It is further noted that the methods of filtering a packet using an ingress and/or egress port map as discussed herein can be implemented at any stage during a partial match or exact match checking method(s), such as before, during and after the method(s) of filtering a packet using a port bit map 40. For instance, the method(s) of partial match or exact match checking can be implemented first to determine if there is a partial match, an exact match or a no-match, and thereafter a method of filtering the packet using a port bit map 40 can be implemented within a network device 10. In the alternative, the method of filtering the packet using a port bit map 40 can be implemented first to determine if there is a match or no-match between an ingress/egress port bit map 40*a*, 40*b* and an port match entry 80, and thereafter the method(s) of partial match and/or exact match checking can be implemented within a network device 10. Additionally, the method of filtering a packet using a port bit map 40 can be implemented at the same time as the method(s) of a partial match and/or exact match checking, wherein the port bit map 40 can be compared with each one of the port match entry 80 at the same time as the masked packet is compared with each one of the rules entry 75. In other words, the port bit map 40 can be AND with each one of the port match entry 80 and can be AND with the masked packet AND with each one of the rules entry 75.

Furthermore in another alternative method, a partial match could be defined as when there is no exact match with any one of the rules entry 75, and yet there is a match between a port bit map 40 and an identified port match entry and there is a match of some other qualifier(s). In other words, a method of filtering a packet based on partial match and a port bit map 40 can be implemented when there is no exact match between a masked packet and any one of the rules entry 75. However, there is a match between the masked packet with some other qualifier, and also a match between the a port bit map 40 and an identified port match entry.

For example, the method steps of FIGS. 2 and 3 can also be combined with the method(s) of a partial match and/or exact match checking, a provided in the following conditional expressions:

```
1)   IF (other field exact match);
         THEN
             {IF ((port bit map AND port match entry) > 0);
             THEN
                 match;
             ELSE
                 no-match.};
     ELSE
         {no-match.}
2)   IF ((other fields exact match) AND ((port bit map AND port
     match entry) > 0));
         THEN
             {match;}
         ELSE
             {no-match.}
3)   IF ((other field exact match); THEN
```

-continued

```
{IF ((port bit map AND port match entry) > 0);
    THEN
        {exact match, i.e., implement exact action
        entry;}
    ELSE
        {no-match.};
ELSE IF (other fields do not exactly match); THEN
    {IF ((port bit map AND port match entry) > 0)
AND (other qualifier)};
        THEN
            {partial match, i.e., implement
            partial match action entry;}
        ELSE
            {no-match.}}
```

Figure 4:
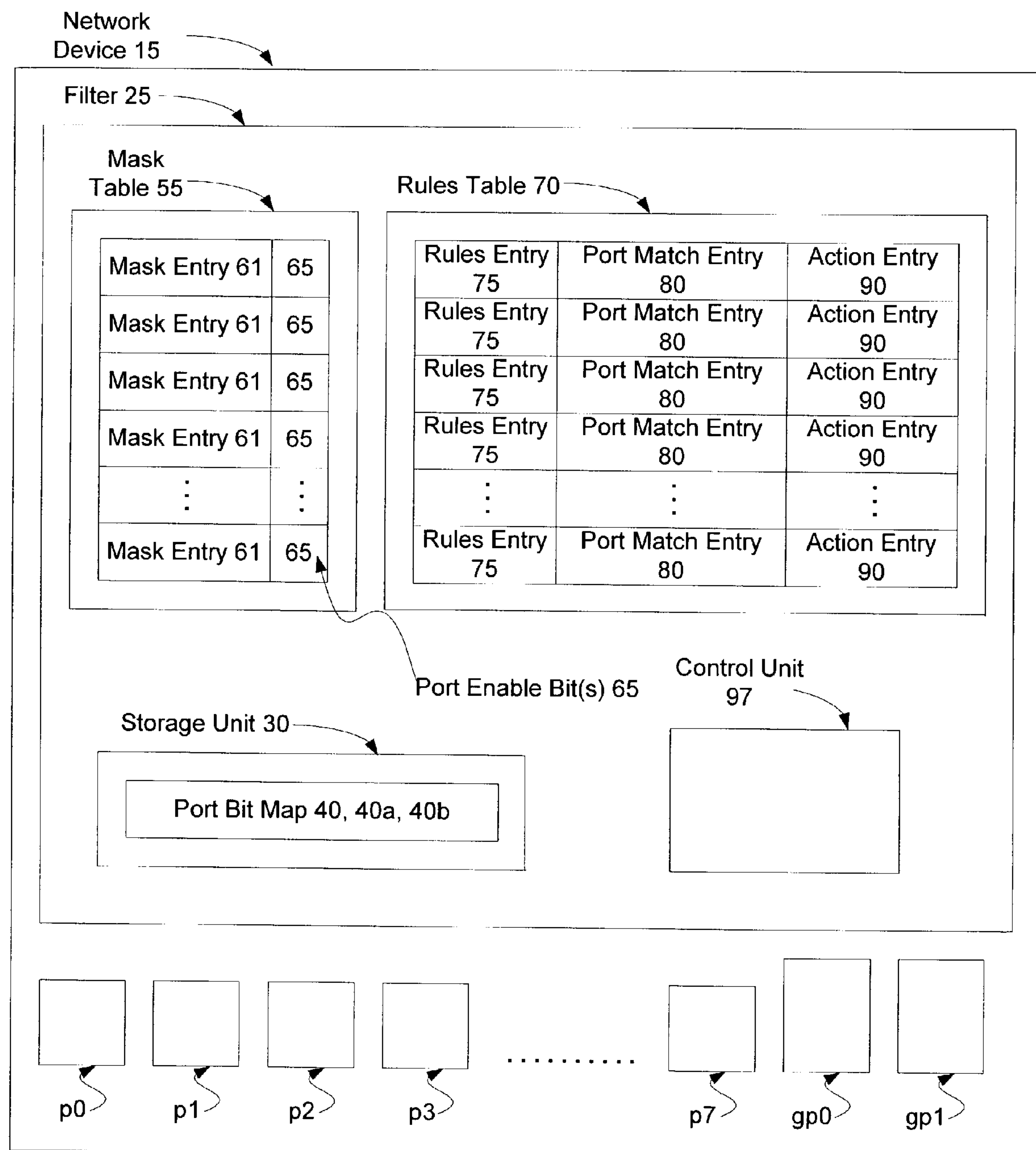
FIG. 4 illustrates another example of a configuration for filtering a packet in accordance to the present invention.

FIG. 4 illustrates another example of a hardware configuration that can perform packet filtering based on a port bit map, in accordance with the present invention. The performance of packet filtering can also be referred to as packet classification. Therefore, the hardware configurations and examples provided herein can also perform packet classification.

Additionally, the hardware configuration of FIG. 4 can be in an integrated, modular and single chip solution, and therefore can be embodied on a semiconductor substrate, such as silicon. Alternatively, the hardware configuration of FIG. 4 can be embodied in a plurality of discrete components on a circuit board.

The configuration as shown in FIG. 4 illustrates a network device 15. In addition, FIG. 4 shows a mask table 55 within filter 25. The mask table 55 can have a plurality of mask entries 61 therein. Each mask entry 61 can represent a filter mask for masking an incoming packet based on one or more programmable condition(s). Therefore, each mask entry 61 can be pre-programmed with one or a plurality of filtering condition(s), including but not limited to an exact match or partial-bit match condition(s). Accordingly, the mask table 55 can mask an incoming packet through one or more mask entry therein.

In addition, the mask table 55 can include a port enable bit 65. Each mask entry 61 within the mask table 55 can correspond to a port enable bit 65. The port enable bit 65 can be a bit string having one or two bit(s) length. A one-bit port enable bit 65 can enable both ingress and egress port bit match checking simultaneously. In a two-bit port enable bits 65, one of the two bits can correspond to the enabling of the ingress port bit match checking, and the other bit of the two bits can correspond to the enabling of the egress port bit match checking. Accordingly, a two-bit port enable bits 65 can selectively enable either the ingress port bit match checking or enable the egress port bit match checking, or both by setting the conditions within the two-bit port enable bits 65.

The port enable bit(s) 65 can enable or activate the network device 10 to include and consider a port bit map 40 when performing packet filtering with the network device 10. For example, when a single port enable bit 65 is set with a condition of "1", then the network device 10 enable or activate the functionality of including a port bit map 40 when performing a filter on a packet received. In another alternative, the port enable bits 65 can be a 2-bit. When either one or both of the bit positions of the 2-bit port enable 65 is/are set with a condition of "1", then the network device 10 can enable or activate the functionality of including a port bit map 40*a* and/or a port bit map 40*b* respectively when performing a filter on a packet received.

FIG. 4 also shows a control unit 97 within filter 25. The control unit 97 can perform a function of comparing the port bit map 40 with a respective port match entry 80, and with the port enable bit(s) 65 to determine if there is a match or no-match. The function of comparing a port bit map 40 with a respective port match entry 80, and with a port enable bit(s) 65 can be implemented by one of many ways or techniques. One such implementation technique can include the logical AND'ing of the port bit map 40, with a respective port match entry 80, and with a port enable bit(s) 65. It is noted that although the control unit 97 is provided within filter 25, the control unit 97 can be provided outside the filter 25.

It is noted that the other elements shown in FIG. 4, such as storage unit 30, port bit map 40, rules table 70, rules entry 75, port match entry 80, and action entry 90 can be configured to have substantially the same scope and functions as discussed above with respect to FIG. 1.

Figure 5:
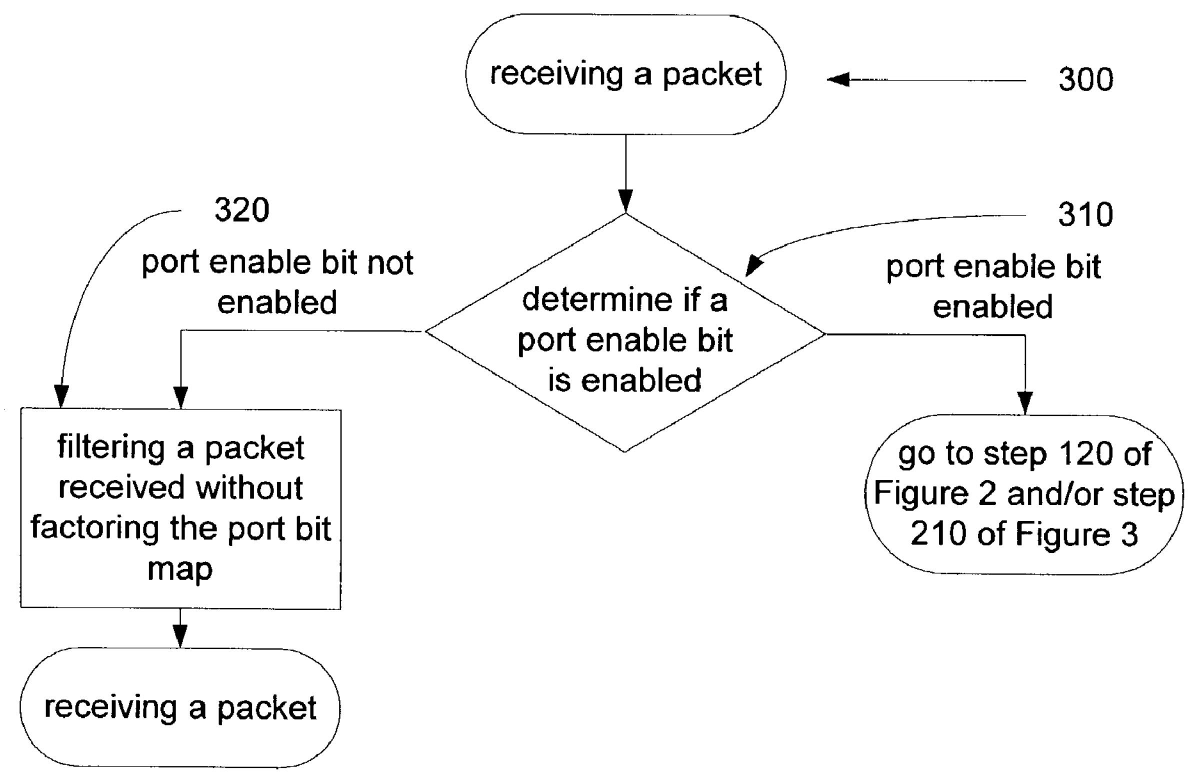
FIG. 5 illustrates a flow chart illustrating another example of a method of filtering a packet in accordance to the present invention.

FIG. 5 illustrates another example of a method of filtering incoming packets with respect to egress port(s) in accordance with the present invention. The method of the present example can be implemented in hardware, or software, or a combination of both hardware and software.

An incoming packet can be received in an ingress port within a network device 10. Accordingly, a network device at step 300 of FIG. 5 can receive a packet in an ingress port. Upon receiving the packet, the internal logic of the network device 10 at step 310 can determine if a port enable bit 65 is enabled or is not enabled. For this example, the port enable bit 65 is a 1-bit port enable bit 65. For example, if the 1-bit port enable bit 65 is set with a condition of "1", then the port enable bit 65 is enabled. In the alternative example, if the 1-bit port enable bit 65 is set with a condition of "0", the port enable bit 65 is not enabled.

When a port enable bit 65 is not enabled, step 320 of the present example can thereafter implement a method of filtering a packet received without considering or factoring the methods of filtering a packet using a port bit map 40. In other words, when a port enable bit 65 is not enabled, such as being set with a condition of "0", the internal logic within the network device 10 can determine to filter a packet received without considering or implementing the methods of generating a port bit map 40, identifying a port match entry 80, and comparing the port bit map 40 with the port match entry 80, and etc. In essence, the network device can perform packet filtering without factoring the methods using the port bit map 40 when the port enable bit 65 is not enabled.

In the alternative, when a port enable bit 65 is enabled, the present example can continue with step 120 of FIG. 2 and/or step 210 of FIG. 3 as discussed above, in accordance with the present invention. For instance, if the port enable bit 65 is set with a condition of "1", then the present example can continue with step 120 of FIG. 2 and/or step 210 of FIG. 3 as discussed above.

Although the examples of filtering a packet using a port bit map as illustrated in FIGS. 4 and 5 can be implemented as discussed above by itself, it is noted that the examples thereof can be implemented together with partial match or exact match checking method(s) or an apparatus thereof. In other words, the methods of and the apparatus for filtering a packet using an ingress and/or egress port bit map 40*a*, 40*b* and a port enable bit 65 can be combined with partial match and/or exact match checking of a masked packet and at least one rules entry 75. For example, an incoming packet received within a network device 15 can be masked through each and every mask entry 61 within a mask table 55. Upon masking the incoming packet through each and every mask entry 61, the port enable bit 65 is checked. If the port enable bit 65 is determined to be not enabled, then the masked packet can be indexed or applied to a rules table 70 to identify a partial match and/or an exact match rules entry 75, and/or a no match entry. Upon identifying a partial and/or an exact matching rules entry 75, the internal logic of the network device 15 can implement at least one action within the respective action entry 90, without considering the port bit map. In the alternative, if the port enable bit 65 is determined to be enabled, then the network device 15 can proceed to filter the packet by implementing a partial match and/or an exact match checking together with factoring in the methods associated with using the port bit map as discussed above.

It is further noted that the methods of filtering a packet using an ingress and/or egress port map as discussed herein can be implemented at any stage during the partial match and/or exact match checking method(s) and at any stage during the port enable bit checking, such as before, during and after the method(s) of filtering a packet using a port bit map 40. For instance, the method(s) of partial match and/or exact match checking along with the method(s) of port enable bit checking can be implemented first to determine if there is a partial match, an exact match or no-match, and if the port enable bit is enabled or not enabled. Thereafter, a method of filtering the packet using a port bit map 40 can either be implemented or not implemented within a network device 15 depending one whether the port enable bit is enabled or not enable, respectively. Additionally, the method of filtering a packet using a port bit map 40 can be implemented at the same time as the method of partial or exact match checking and port enable bit checking, wherein the mask packet is compared with each one of the rules entry 75 at the same time the port enable bit 65 is checked, and at the same time the port bit map 40 is compared with one of the port match entry 80. In other words, the masked packet and can be AND'ed with one of the rules entry 75, and can be AND'ed with the port enable bit 65, and the port bit map 40 can be AND'ed with one of the port match entry 80, all at once.

For example, the methods of and the apparatus for filtering a packet as discussed with respect to FIGS. 4 and 5 can be combined with the methods of partial or exact match checking and port enable bit checking as expressed in the following conditional expressions:

```
1)  IF ((other field exact match) AND (port enable bit=1)); THEN
          {IF ((port bit map AND port match entry) > 0); THEN
                    match;
               ELSE
                    no-match;}
                    ELSE IF ((other field exact mach) AND
                    (port enable bit = 0));
    THEN
          {match;}
    ELSE
          {no match;}
2)  IF ((other fields exact match) AND (port enable bit=1); AND
    ((port bit map AND port match entry) > 0)); THEN
          {match;}
    ELSE IF (other field exact match) AND (port enable bit =0));
    THEN
          {match;}
    ELSE
          {no-match.}
3)  IF ((other fields exact match) AND (port enable bit=1) AND
    ((port bit map AND port match entry) > 0); THEN
          {match;}
    ELSE IF (other field exact match) AND (port enable bit=0));
    THEN
          {match;}
               ELSE IF (other fields do not exactly match) AND
```

-continued

```
               (port enable bit =1)) AND ((port bit map AND
               port match entry) > 0) AND (other qualifiers));
               THEN
                    {partial match;}
                         ELSE IF ((other fields do not
                         exactly match) AND (port enable
                         bit=0)) AND (other qualifiers
                         match); THEN
                              {partial match;}
    ELSE
          {no-match.}
```

Accordingly, conditional expression number 1) above can first compare the other exact match fields and the port enable bit. If the first comparison results in a match or in a value greater than zero, and the port enable bit is set with a condition of "1", then the port bit map can be compared with one of the port match entry, by AND'ing the two. If the result is a match or is a value greater than zero, then it is a complete exact match and the corresponding actions can be taken accordingly. However, if the result is a no-match or is not a positive value, then it is determined to be a no-match. Accordingly, if the first comparison results in a no-match, then a second comparison can be implemented to check for a match or for a value greater than zero, and to check if the port enable bit is set with "0" If the second comparison results in a match or results in a value greater than zero, then the port bit map is not compared and thereafter, it is determined to be an exact match. However, if the first and second comparisions do not result in a match, then it is determined to be a no-match.

The conditional expression number 2) above can simultaneously compare the exact match fields with the port enable bit and with the port bit map and port match entry.

Furthermore, the third conditional expression number 3) can further extends the expression 2) by adding partial match checking when other fields do not exactly match. In other words, if the first and second comparisons fail, then a third comparison can be performed. The third comparison can check if the port enable bit is set to a condition of "1", can check if a port bit map matches a port match entry, and can check if there is a match with some other qualifier(s). Thereafter, the third comparison can perform a logical AND operation on the results of all three checking operations. If the AND'ing of the three checking operations results in a value greater than zero, then it is determined to be a partial match. Accordingly, at least one corresponding partial match action (s) in Filter 25 can be implemented. However, if the three checking operations of the third comparison do not result in a value greater than zero, then a fourth comparison can be performed to check if the port enable bit is set to "0" and to check if there is a match with some other qualifier(s). These two checking operations can be AND'ed together. If the result of AND'ing the two results in a value greater than zero, then it is determined still a partial match. However, if the result of AND'ing the two results in a value equal to zero, then, it is determined to be complete no-match.

The above-disclosed configurations of the present invention can be embodied in a hardware configuration such as a semiconductor substrate. Furthermore, the methods of the invention can be implemented in hardware, or software, or a combination of both hardware and software. In addition, a person of skill in the art with respect to semiconductor design and manufacturing would be able to implement the various elements and methods of the present invention onto a single semiconductor substrate, based upon the architectural description discussed above.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method of processing a packet in a communication network, said method comprising the steps of:

receiving the packet in a network component;

masking the packet based on one or more programmable conditions;

determining if a port bit is enabled;

generating a port bit map based on at least one of an ingress port on which the packet is received or an egress port to which the packet is directed within the network component when the port bit is enabled;

identifying a port match entry;

comparing the port bit map with the port match entry; and implementing at least one action when there is a match between the port bit map and the port match entry.

2. The method of claim 1, wherein the step of generating comprises the step of:

generating the port bit map having a bit length that equals to a number of the at least one port within the network component.

3. The method of claim 2, wherein the step of generating comprises the step of:

generating the port bit map wherein each bit position of the port bit map corresponds to a respective port within the network component.

4. The method of claim 3, wherein the step of generating comprises the steps of:

setting each bit position of the port bit map with a first conditional flag when the respective port is related to the packet; and setting each bit position of the port bit map with a second conditional flag when the respective port is not related to the packet.

5. The method of claim 4, wherein the step of setting comprises the step of:

setting each bit position of the port bit map with the first conditional flag when the respective port is an ingress port that received the packet.

6. The method of claim 4, wherein the step of setting comprises the step of:

setting each bit position of the port bit map with the first condition flag when the respect port is an egress port for transmitting the packet received.

7. The method of claim 1, wherein the step of identifying comprises the step of:

identifying the port match entry in a table within the network component.

8. The method of claim 7, wherein the step of identifying comprises the step of:

identifying the port match entry wherein the port match entry is represented by a bit string.

9. The method of claim 8, wherein the step of identifying comprises the step of:

identifying the port match entry wherein at least one bit position of the port match entry corresponds to the at least one port within the network component.

10. The method of claim 9, wherein the step of identifying comprises the step of:

identifying the port match entry wherein the at least one bit position of the port match entry corresponds to at least one ingress port within the network component.

11. The method of claim 9, wherein the step of identifying comprises the step of:

identifying the port match entry wherein the at least one bit position of the port match entry corresponds to at least one egress port within the network component.

12. The method of claim 1, wherein the step of comparing comprises the step of:

comparing the port bit map with the port match entry by implementing a logical AND operation.

13. The method of claim 12, wherein the step of implementing comprises the step of:

implementing the at least one action when a positive value results from implementing the logical AND operation.

14. The method of claim 1, further comprising the steps of:

masking the packet through at least one mask entry; and identifying an enable bit string within the at least one mask entry.

15. The method of claim 14, wherein the step of comparing comprises the step of:

comparing the port bit map with the port match entry when at least one bit within the enable bit string is set.

16. The method of claim 15, wherein the step of comparing comprises the step of:

comparing the port bit map with the port match entry and with the at least one bit within the enable bit string by implementing a logical AND operation.

17. The method of claim 16, wherein the step of implementing comprises the step of:

implementing the at least one action when a positive value results from comparing the port bit map with the port match entry and with the at least one bit within the enable bit string.

18. A network device for processing a packet, said network device comprising:

at least one port within the network device configured to receive or transmit a packet;

a storage unit configured to store a port bit map, wherein the port bit map corresponds to the at least one port;

at least one mask entry configured to mask the packet, wherein the at least one mask entry includes an enable bit string therein;

a rules table configured to have at least one port match entry and at least one action corresponding to the at least one port match entry therein; and a control unit configured to determine if at least one bit within the enable bit string is set and, when at least one bit within the enable bit string is set, to compare the port bit map with the at least one port match entry, and to implement the at least one action when there is a match between the port bit map and the port match entry, wherein the port bit map is generated based on at least one of a ingress port on which the packet is received or an egress port to which the packet is directed.

19. The network device of claim 18, wherein the storage unit is configured to store the port bit map having a bit length that equals to a number of the at least one port.

20. The network device of claim 19, wherein the storage unit is configured to store the port bit map, and wherein each bit position of the port bit map corresponds to a respective port of the at least one port.

21. The network device of claim 20, wherein the storage unit is configured to store the port bit map, and wherein each bit position of the port bit map is set with a first conditional flag when the respective port is related to the packet, and wherein each bit position of the port bit map is set with a second conditional flag when the respective port is not related to the packet.

22. The network device of claim 21, wherein the storage unit is configured to store the port bit map, and wherein each bit position of the port bit map is set with the first conditional flag when the respective port is an ingress port that received the packet.

23. The network device of claim 21, wherein the storage unit is configured to store the port bit map, and wherein each bit position of the port bit map is set with the first conditional flag when the respective port is an egress port for transmitting the packet received.

24. The network device of claim 18, wherein the rules table is configured to have the at least one port match entry, and wherein the at least one port match entry is represented by a bit string.

25. The network device of claim 24, wherein the rules table is configured to have the at least one port match entry, and wherein at least one bit position of the port match entry corresponds to the at least one port within the network component.

26. The network device of claim 25, wherein the rules table is configured to have the at least one port match entry, and wherein the at least one bit position of the port match entry corresponds to at least one ingress port within the network component.

27. The network device of claim 25, wherein the rules table is configured to have the at least one port match entry, and wherein the at least one bit position of the port match entry corresponds to at least one egress port within the network component.

28. The network device of claim 18, wherein the control unit is configured to compare the port bit map with the at least one port match entry by implementing a logical AND operation.

29. The network device of claim 28, wherein the control unit is configured to compare the port bit map with the at least one port match entry, and to implement the at least one action when a positive value results from comparing the port bit map with the port match entry.

30. The network device of claim 18, wherein the control unit is configured to compare the port bit map with the at least one port match entry and with the at least one bit within the enable bit string by implementing a logical AND operation.

31. The network device of claim 30, wherein the control unit is configured to implement the at least one action when a positive value results from comparing the port bit map with the port match entry and with the at least one bit within the enable bit string.

32. A system for processing a packet in a communication network, said system comprising:

a receiving means for receiving the packet in a network component;

a masking means for masking the packet through at least one mask entry; and an identifying means for identifying an enable bit string within the at least one mask entry;

a generating means for generating a port bit map based on at least one of an ingress port on which the packet is received or an egress port to which the packet is directed within the network component;

an identifying means for identifying a port match entry;

a comparing means for comparing the port bit map with the port match entry when at least one bit within the enable bit string is set; and an implementing means for implementing at least one action when there is a match between the port bit map and the port match entry.

33. The system of claim 32, wherein the generating means generates the port bit map having a bit length that equals to a number of the at least one port within the network component.

34. The system of claim 33, wherein the generating means generates the port bit map, wherein each bit position of the port bit map corresponds to a respective port within the network component.

35. The system of claim 34, wherein the generating means comprises of:

a setting means for setting each bit position of the port bit map with a first conditional flag when the respective port is related to the packet, and setting each bit position of the port bit map with a second conditional flag when the respective port is not related to the packet.

36. The system of claim 35, wherein the setting means sets each bit position of the port bit map with the first conditional flag when the respective port is an ingress port that received the packet.

37. The system of claim 35, wherein the setting means sets each bit position of the port bit map with the first condition flag when the respect port is an egress port for transmitting the packet received.

38. The system of claim 32, wherein the identifying means identifies the port match entry in a table within the network component.

39. The system of claim 38, wherein the identifying means identifies the port match entry wherein the port match entry is represented by a bit string.

40. The system of claim 39, wherein the identifying means identifies the port match entry wherein at least one bit position of the port match entry corresponds to the at least one port within the network component.

41. The system of claim 40, wherein the identifying means identifies the port match entry wherein the at least one bit position of the port match entry corresponds to at least one ingress port within the network component.

42. The system of claim 40, wherein the identifying means identifies the port match entry wherein the at least one bit position of the port match entry corresponds to at least one egress port within the network component.

43. The system of claim 32, wherein the comparing means compares the port bit map with the port match entry by implementing a logical AND operation.

44. The system of claim 43, wherein the implementing means implements the at least one action when a positive value results from implementing the logical AND operation.

45. The system of claim 32, wherein the comparing means compares the port bit map with the port match entry and with the at least one bit within the enable bit string by implementing a logical AND operation.

46. The system of claim 45, wherein the implementing means implements the at least one action when a second positive value results from comparing the port bit map with the port match entry and with the at least one bit within the enable bit string.

* * * * *